United States Patent
Nakamura

(10) Patent No.: US 6,407,372 B1
(45) Date of Patent: Jun. 18, 2002

(54) ECCENTRIC DRIVING APPARATUS

(75) Inventor: Tatemi Nakamura, Fujiidera (JP)

(73) Assignee: Fuji Electronics Industry Co., Ltd. (JP)

( * ) Notice: Subject to any disclaimer, the term of this patent is extended or adjusted under 35 U.S.C. 154(b) by 0 days.

(21) Appl. No.: 09/715,351

(22) Filed: Nov. 17, 2000

(30) Foreign Application Priority Data

Mar. 28, 2000 (JP) ........................................ 2000-087942

(51) Int. Cl.$^7$ ................................................. H05B 6/10
(52) U.S. Cl. ........................ 219/639; 74/570; 148/572
(58) Field of Search ........................... 219/639, 635, 219/652; 148/572, 573; 475/107, 154, 210; 74/49, 50, 55, 570, 571 R, 571 L, 571 M

(56) References Cited

U.S. PATENT DOCUMENTS

| | | | | |
|---|---|---|---|---|
| 4,022,082 A | * | 5/1977 | Uchimoto | .................. 74/570 |
| 4,728,761 A | * | 3/1988 | Mucha et al. | ............... 219/639 |
| 4,862,756 A | * | 9/1989 | Dutschke | ...................... 74/26 |
| 5,503,038 A | * | 4/1996 | Aquino et al. | ................. 74/49 |

* cited by examiner

Primary Examiner—Teresa Walberg
Assistant Examiner—Quang T Van
(74) Attorney, Agent, or Firm—Kilyk & Bowersox, P.L.L.C.

(57) ABSTRACT

To arbitrarily adjust the diameter of revolution when revolving an object without being associated with rotation by a simple structure.

A bearing 322a is mounted to a bottom surface of a supporting plate 310 for supporting an object. First rotation sleeve 322c is rotatably provided inside the bearing 322a. A second rotation sleeve 322d is provided inside the first rotation sleeve 322c. The second rotation sleeve 322d is rotated at a fixed position by means of a rotation driving shaft 321. An inner peripheral surface of the first rotation sleeve 322c is inclined at a certain angle in one direction with respect to the center line of rotation. An outer peripheral surface of the second rotation sleeve 322d is inclined at a certain angle in one direction in correspondence with the inner peripheral surface of the first rotation sleeve 322c. The first rotation sleeve 322 and the second rotation sleeve 322d simultaneously rotate in the circumferential direction, and can relatively move in the direction of the center of rotation. By this relative movement, an amount of eccentricity of the bearing 322a with respect to the rotation driving shaft 321 is adjusted to an arbitrary value including zero.

4 Claims, 9 Drawing Sheets

ECCENTRIC DRIVING APPARATUS

BACKGROUND OF THE INVENTION

1. Field of the Invention

The present invention relates to an eccentric driving apparatus for causing a certain object to revolutionarily move without being associated with auto-rotational movement, and more specifically to an eccentric driving apparatus suitable for use in hardening equipment for cam shaft which carries out simultaneous hardening of the outer peripheral surface of each cam of a cam shaft having plural kinds of cams of different phases formed thereon.

2. Prior Art

A cam shaft used in an engine for an automobile has plural kinds of cams having different phases, and induction hardening is carried out on the outer peripheral surface of each cam. For achieving this induction hardening, a heating device equipped with a plurality of heating coils of circular shape which correspond to the respective cams is utilized. That is, a cam shaft is rotated in the state that a cam shaft is passed through the plurality of heating coils which are arranged in the direction of central line and the corresponding cams are positioned inside the respective heating coils, and whereby induction heating of the outer peripheral surface of each cam is effected simultaneously.

In conventional hardening equipment for a cam shaft, the plurality of heating coils are concentrically arranged, so that the center of the cam shaft corresponds to the center of the coils. Therefore, in the hardening of each cam, as shown in FIG. 6, the outer peripheral surface of each cam 11 of a cam shaft 10 is heated while being rotated inside a heating coil 21 in the state that the center O1 thereof corresponds to the center O2 of the heating coil 21, and subsequently cooled to complete hardening.

In such a way of hardening, however, a convex portion of the cam 11 always moves in the vicinity of the inner surface of the heating coil 21, which causes an essential disadvantage that the portion in question is hardened in larger depth than other portions.

For eliminating this disadvantage, the applicant of the present invention has developed such hardening technique that, as shown in FIG. 7, the center O2 of the heating coil 21 is made to be eccentric away from the center O1 of the cam 11 toward the convex side, and the heating coil 21 is revolved about the center O1 of the cam 11 in accordance with the rotation of cam 11, thereby hardening the outer peripheral surface of the cam 11 with a substantially uniform depth over the entire circumference (See Japanese Patent Application No. 11-319879 (1999) and Japanese Patent Application 2000-020417). As the hardening equipment for realizing the above technique, those shown in FIG. 8 or 9 have been suggested.

In the hardening equipment shown in FIG. 8, a plurality of heating devices 20, 20 corresponding to cam phases of the cam shaft 10 are provided. The plurality of heating devices 20, 20 are arranged on both sides of a hardening position of the cam shaft 10, respectively. Each heating device 20 has the heating coil 21 of circular shape which fits with the outside of the corresponding cam 11 of the cam shaft 10 and a transformer 22 for supplying the heating coil 21 with electric power, and the heating coils 21, 21 are made to be eccentric from the center O1 of the corresponding cams 11, 11 toward the convex side by a certain amount.

Each heating device 20 is revolved by an eccentric driving apparatus 30. The eccentric driving apparatus 30 has a support 31 for supporting the transformer 22, a bearing 32 attached on the bottom surface of the support 31, an eccentric cam 33 to be fitted with the bearing 32 and a rotation driving shaft 34 for driving the eccentric cam 33.

In the eccentric driving apparatuses 30, 30 disposed on both sides, the rotation driving shafts 34, 34 are driven by a common driving source 40. The eccentric cams 33, 33 are deflected in their rotation phases in accordance with the phase difference between the corresponding cams 11, 11 of the cam shaft 10.

In the hardening, the driving source 40 is actuated in accordance with the rotation of the shaft 10 to rotate the driving shafts 34, 34. In response to this, the heating devices 20, 20 revolve at a certain phase difference without auto-rotating. As a result, the heating coils 21, 21 revolve about the center O1 of the corresponding cams 11, 11 without being associated with auto-rotation.

To the contrary, in the hardening equipment shown in FIG. 9, the heating devices 20, 20 are driven by the eccentric driving apparatus 30, 30 of the biaxial driving system. That is, the eccentric driving apparatus 30 has two driving sources 35, 36 for linearly driving the heating device 20 in two directions perpendicular to the center line of the cam shaft 10, and the heating device 20 is caused to revolve by operation control of the driving sources 35, 36.

Comparing the hardening equipment shown in FIG. 8 and the hardening equipment shown in FIG. 9, the heating devices 20, 20 are the same between these equipments. However, the eccentric driving apparatuses 30, 30 are significantly different between these equipments. That is, in the hardening equipment shown in FIG. 8, the eccentric driving apparatuses 30, 30 are driven by the common driving source 40, while in the hardening equipment shown in FIG. 9, the eccentric driving apparatuses 30, 30 each need the two driving sources 35, 36, individually. Therefore, the former hardening equipment shown in FIG. 8 is much simpler in structure so that the cost thereof is low.

The eccentric driving apparatuses 30, 30 shown in FIG. 8, however, have a significant problem in the hardening operation as follows.

More specifically, in the case of carrying out hardening on the cam shaft 10, the cam shaft 10 is positioned at the hardening position while being passed through the heating coils 21, 21 aligned in the axial direction. In the eccentric driving apparatuses 30, 30 of the hardening equipment shown in FIG. 8, the amount of eccentricity is uniquely determined by the eccentric cams 33, 33 and hence the adjustment thereof is impossible, with the result that the heating coils 21, 21 are made to be eccentric fixedly in different directions in accordance with the phases of the cams 11, 11 of the cam shaft 10.

For this reason, it is impossible to effect the operation of zero recover for bringing the respective centers of the heating coils 21, 21 into correspondence with the respective centers O1 of the cams 11, 11, so that it is impossible to concentrically align the heating coils 21, 21. As a result, the positioning operation of the cam shaft 10 at the time of hardening operation becomes difficult and even becomes impossible when the amount of eccentricity of the heating coils 21, 21 is large. Furthermore, the amount of eccentricity of the heating coils 21, 21 is restricted to cause some troubles for uniform hardening of the respective outer peripheral surfaces of the cams 11, 11.

Incidentally, in the eccentric driving apparatuses 30, 30 of the hardening equipment shown in FIG. 9, the heating coils 21, 21 are easily recovered to the zero positions and concentrically aligned by controlling the driving sources 35, 36.

The present invention has made in consideration of the above problems, and an object of the present invention is to provide an eccentric driving apparatus having a simple structure and enabling arbitrary and simple adjustment of the amount of eccentricity.

SUMMARY OF THE INVENTION

An eccentric driving apparatus according to the present invention is an eccentric driving apparatus for revolving a certain object without being associated with auto-rotation, the eccentric driving apparatus comprising: a bearing for supporting the object, the bearing being supported so as to be movable in two directions perpendicular to the center of the revolution; a first rotation sleeve rotatably fitted to the inside of the bearing, having an inner peripheral surface inclined in one direction with respect to the center of rotation; a second rotation sleeve fitted to the inside of the first rotation sleeve so as to be movable with the same, having an outer peripheral surface inclined in one direction in correspondence with the inner surface of the first rotation sleeve; and a rotation driving shaft fitted to the inside of the second rotation sleeve so as to be movable with the same, wherein the first rotation sleeve and the second rotation sleeve are allowed to relatively move in the direction of the center of rotation, thereby configuring an eccentric cam unit having a variable amount of eccentricity.

Namely, in the eccentric driving apparatus according to the present invention, the inner peripheral surface of the first rotation sleeve is inclined in one direction, and the outer peripheral surface of the second rotation sleeve located inside the first rotation sleeve is inclined in one direction in correspondence with the inner peripheral surface of the first rotation sleeve. Owing to the inclination in one direction of the opposing peripheral surfaces, when the first rotation sleeve and the second rotation sleeve are relatively moved in the direction of the center of rotation, the outer peripheral surface of the first rotation sleeve is moved in parallel in the direction of inclination of the opposing peripheral surfaces with respect to the inner peripheral surface of the second rotation sleeve, so that the amount of eccentricity of the bearing with respect to the rotation driving shaft is adjusted to an arbitrary value including zero. In addition, the first rotation sleeve and the second rotation sleeve revolve while auto-rotating as a result of rotation of the rotation driving shaft, however, since the auto-rotation is not transmitted to the bearing, the bearing just revolves. As a consequence of this, the object can revolve without being associated with auto-rotation with an arbitrary amount of eccentricity including zero.

In the eccentric driving apparatus according to the present invention, it is also possible that at a plurality of positions in the axial direction of the rotation driving shaft, the eccentric cam unit comprising the bearing, the first rotation sleeve and the second rotation sleeve is provided. Furthermore, it is also possible that plural rotation driving shafts are arranged so as to be parallel with each other, and each rotation shaft is provided with the eccentric cam unit comprising the bearing, the first rotation sleeve and the second rotation sleeve.

The eccentric driving apparatus according to the present invention is particularly suitable for use in revolving a heating device used for simultaneous heating of the cams having the same phase in hardening equipment for a cam shaft which carries out hardening of the outer peripheral surface of each cam of a cam shaft on which plural kinds of cams having different phases are formed. In such a case, it is preferable that plural rotation driving shafts are arranged so as to be parallel with each other, and each rotation shaft is provided with the eccentric cam unit comprising the bearing, the first rotation sleeve and the second rotation sleeve. As a consequence, the heating device can be supported in a stable manner and stable revolution can be realized.

EXPLANATION OF REFERENCE NUMERALS

Figure 1:
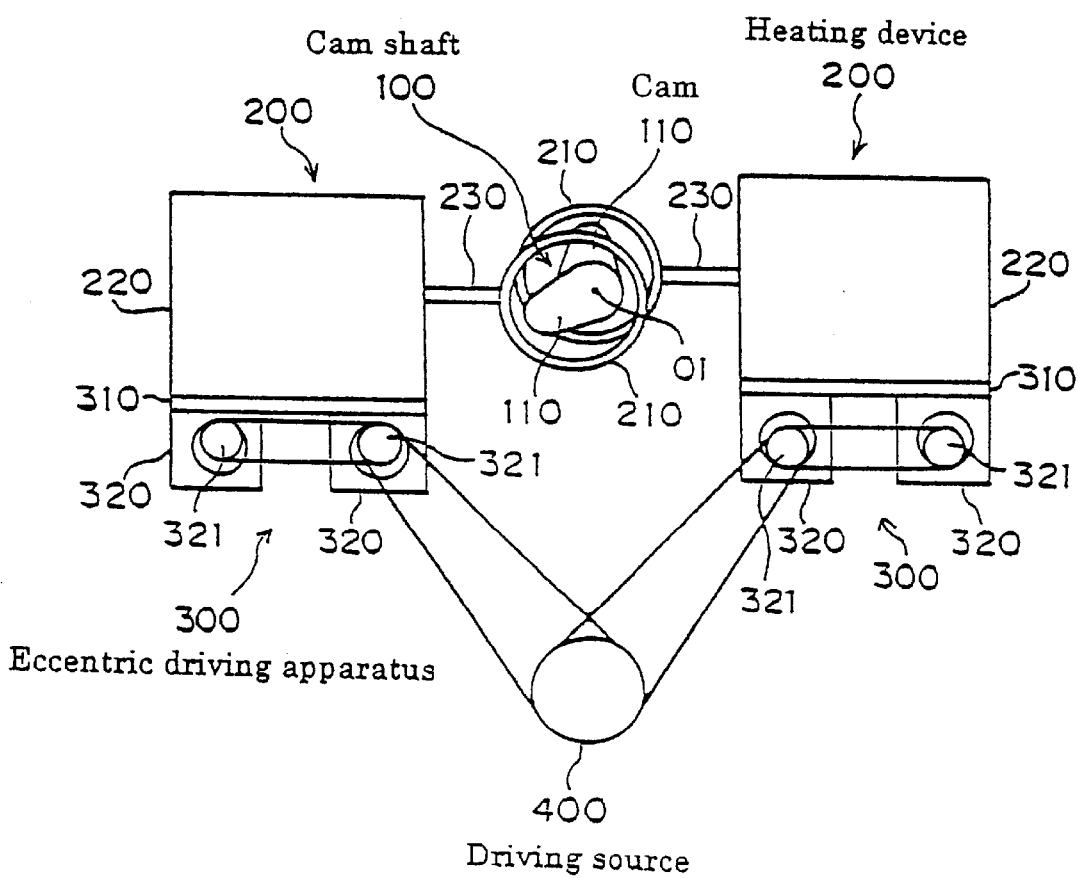
FIG. 1 is a front view of hardening equipment employing an eccentric driving apparatus according to one embodiment of the present invention.

100 Cam shaft
110 Cam
200 Heating device
210 Heating coil
220 Transformer
300 Eccentric driving apparatus
310 Support
320 Driving unit
321 Rotation driving shaft
322 Eccentric cam unit
322a Bearing
322c First rotation sleeve
322d Second rotation sleeve
323, 324 Pulley
330 Base
340 Supporting plate
350 Coupling plate
360 Operational mechanism
361 Screw bar
362 Handle
363 Nut member
400 Driving source

PREFERRED EMBODIMENT OF THE INVENTION

In the following, embodiments of the present invention will be described with reference to the drawings. The hardening equipment shown in FIG. 1 is used for simultaneous hardening of the outer peripheral surfaces of a plurality of cams 110, 110 having different phases of a cam shaft 100. This hardening equipment has a plurality of heating devices 200, 200 disposed so as to correspond with the plurality of cams 110, 110 having different phases of the cam shaft 100 and a plurality of eccentric driving apparatuses 300, 300 for revolving the heating devices 200, 200, respectively.

Figure 8:
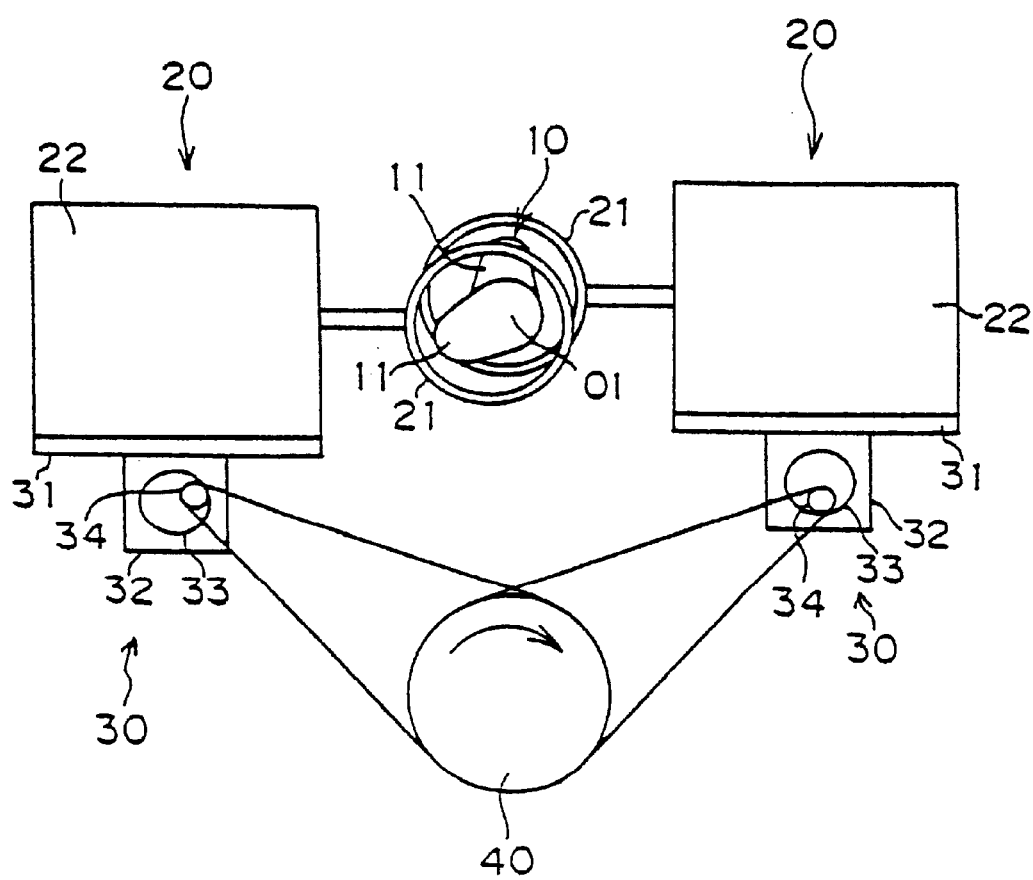
FIG. 8 is a front view of hardening equipment employed for the method for hardening a cam shaft developed by the present applicant.
Figure 9:
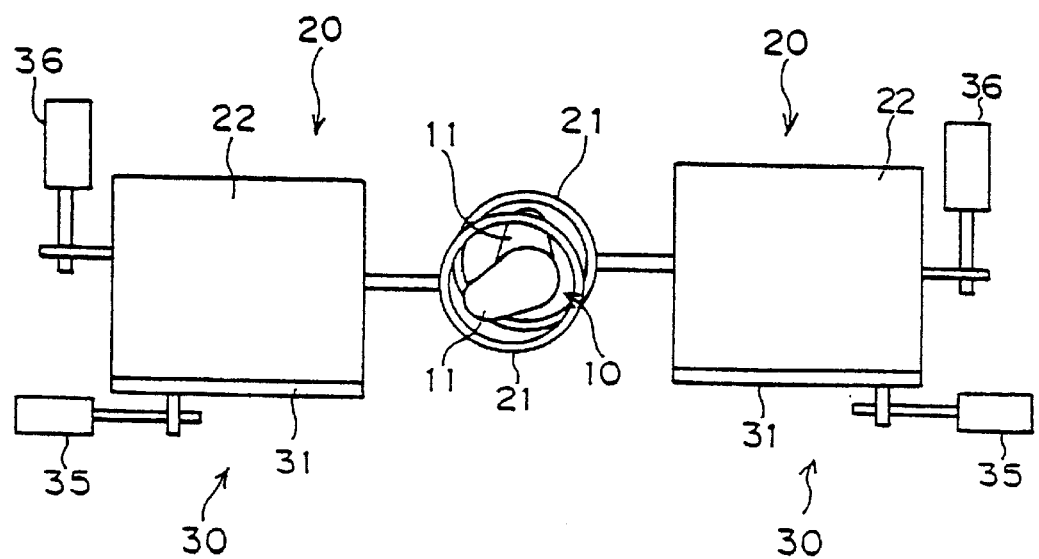
FIG. 9 is a front view of another hardening equipment employed for the method for hardening a cam shaft developed by the present applicant.

A plurality of the heating devices 200, 200 are substantially the same as those used in the hardening equipment shown in FIGS. 8 and 9, and disposed on both sides of the hardening position of the cam shaft 100. Each heating device 200 has a heating coil 210 of circular shape surrounding the corresponding cam 110 of the cam 100 and a transformer 220 for supplying the heating coil 210 with electric power. The heating coil 210 is disposed inside the transformer 220 and electrically connected via a lead 230.

A plurality of the eccentric driving apparatuses 300, 300 are mechanically connected to a common driving source 400, and synchronously driven by the common driving source 400, to thereby synchronously revolve the heating devices 200, 200.

Figure 2:
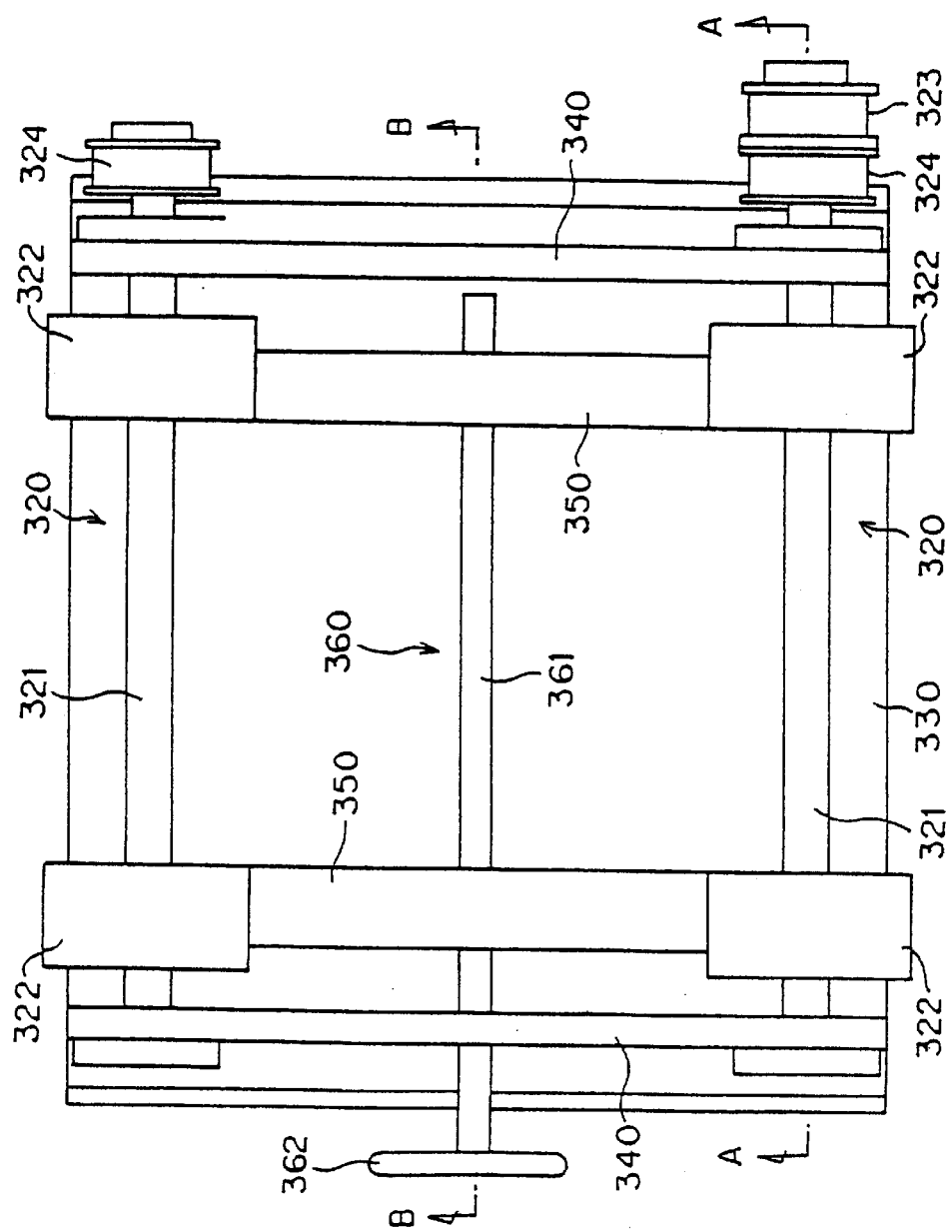
FIG. 2 is a plan view of the same eccentric driving apparatus.
Figure 3:
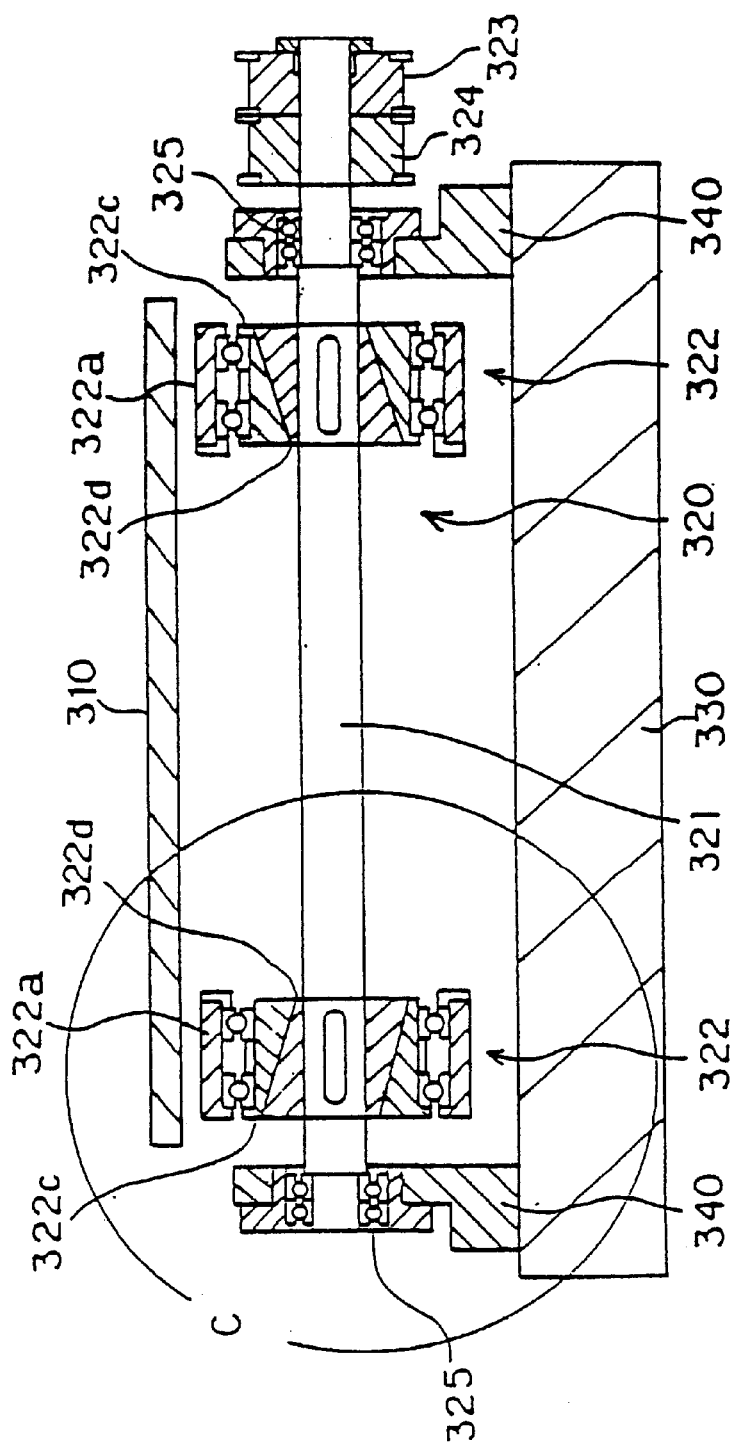
FIG. 3 is a view taken in the direction of the arrows along the line A—A of FIG. 2.

Each eccentric driving apparatus 300 has, as shown in FIGS. 2 and 3, a support 310 for supporting the transformer 220 of the heating device 200, and a pair of driving units 320, 320 disposed on both sides for driving the support 31. The support 310 is movable in two directions perpendicular to the center line of the cam shaft 100, and fixed in the direction of center line. The driving units 320, 320 are mounted on a common base 330.

Each driving unit 320 has a horizontal rotation driving shaft 321, and eccentric cam units 322, 322 mounted at two positions in the axial direction of the rotation driving shaft 321. The rotation driving shaft 321 is parallel to the center line of the cam shaft 110; rotatably supported, via bearings 325, 325, by a pair of front and rear supporting plates 340, 340 mounted on the base 330; and rotated at a fixed position by the common driving source 400.

For coupling with the driving source 400, one of the driving units 320 is attached with a first pulley 323 on one end portion of the rotation driving shaft 321. Furthermore, in order to synchronously drive the respective rotation driving shafts 321, 321 between both driving units 320, 320, a second pulley 324 is attached on one end portion of each of the rotation driving shafts 321, 321. Incidentally, coupling is effected by a timing belt.

Figure 4:
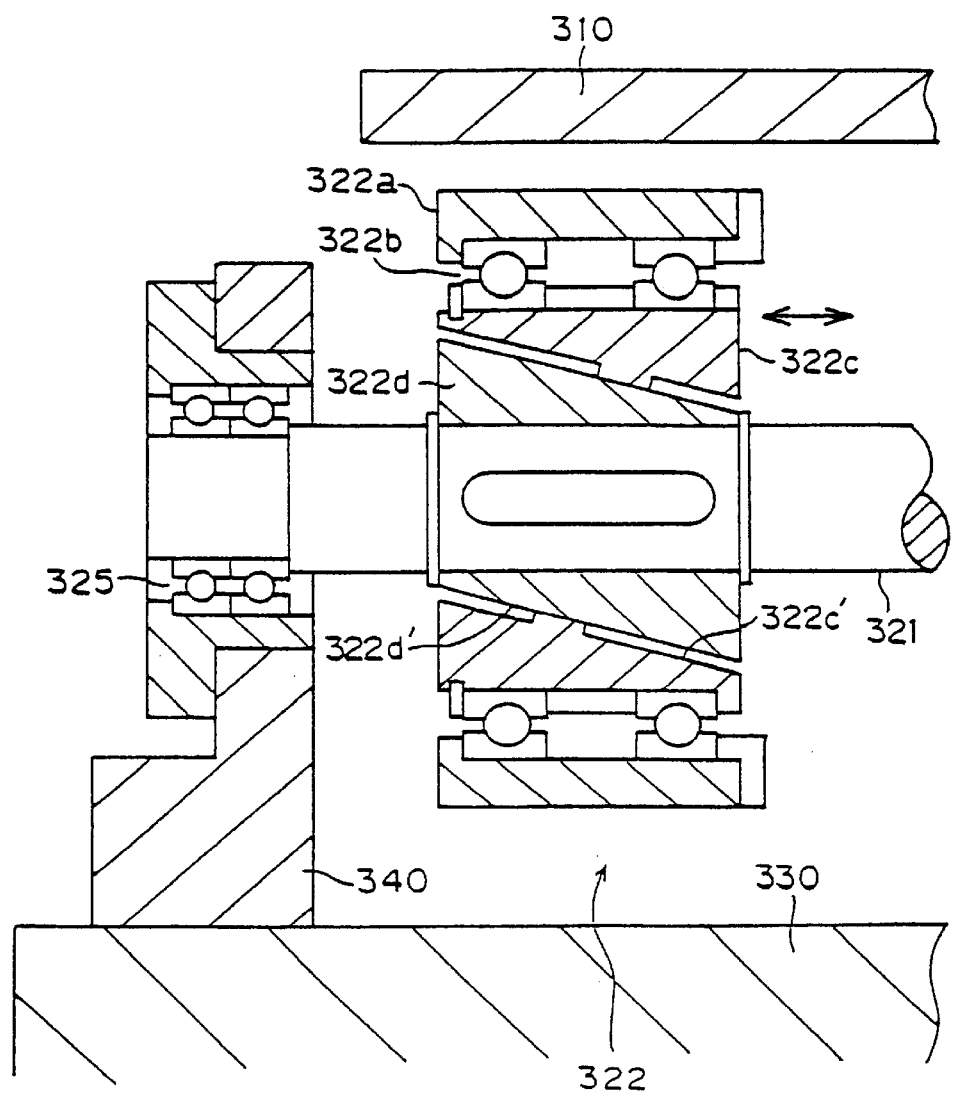
FIG. 4 is an enlarged view of the C portion of FIG. 3.

The eccentric cam units 322, 322 are configured to be for-and-aft symmetric with each other. The eccentric cam unit 322 on the rear side (opposite to the pulley side) comprises, as shown in FIG. 4, a block-like bearing 322a, a first rotation sleeve 322c rotatably fitted to the inside of the bearing 322a via a bearing 322b, and a second rotation sleeve 322d fitted to the inside of the first rotation sleeve 322c.

The bearing 322a is mounted on the bottom surface of the supporting plate 310 so as to be movable in the direction of center line of the rotation driving shaft 321 (in the direction of the center line of the cam shaft 100) while the rotation thereof being restricted. The first rotation sleeve 322c is movable together with the bearing 322a in the direction of the center line of the rotation driving shaft 321 (in the direction of the center line of the cam shaft 100), and an inner peripheral surface 322c' thereof is substantially uniform in inner diameter along the entire length and inclined in one direction at a certain angle with respect to the center line of the rotation driving shaft 321.

On the other hand, the second rotation sleeve 322d is fixed to the outer peripheral surface of the rotation driving shaft 321, and an outer peripheral surface 322d' thereof is uniform in inner diameter along the entire length and inclined in one direction at a certain angle with respect to the center line of the rotation driving shaft 321 in accordance with the inner peripheral surface 322c' of the first rotation sleeve 322c.

While the second rotation sleeve 322d rotates together with the rotation driving shaft 321 and is fixed in the direction of the center line of the rotation driving shaft 321 (in the direction of the center line of the cam shaft 100), the first rotation sleeve 322c is movable in the axial direction with respect to the second rotation sleeve 322d. In other words, the first rotation sleeve 322c and the second rotation sleeve 322d are relatively movable in the axial direction with the inclined peripheral surfaces 322c' and 322d' being as sliding surfaces. In this case, the outer first rotation sleeve 322c moves. As a result of this movement, the inner peripheral surface of the first rotation sleeve 322c moves in parallel with respect to the outer peripheral surface of the second rotation sleeve 322d, and the first rotation sleeve 32c is eccentric away from the second rotation sleeve 322d, with the result that the bearing 322a is eccentric away from the rotation driving shaft 321 by an arbitrary amount of eccentricity including zero.

The cam unit 322 on the front side (on the pulley side) is as same as that of the rear side except that opposing peripheral surfaces of the rotation sleeves 322c, 322d are inclined with respect to the opposing peripheral surfaces of the eccentric cam units 322 of the rear side (opposite to the pulley side) in a for-and-aft symmetric manner.

The corresponding eccentric cam units 322, 322 on both sides are coupled with each other by a coupling plate 350 at their bearings 322a, 322a. The front and rear coupling plates 350, 350 are driven to approach or separate to/from each other by means of an operational mechanism 360 disposed between the driving units 320, 320 on both sides.

Figure 5:
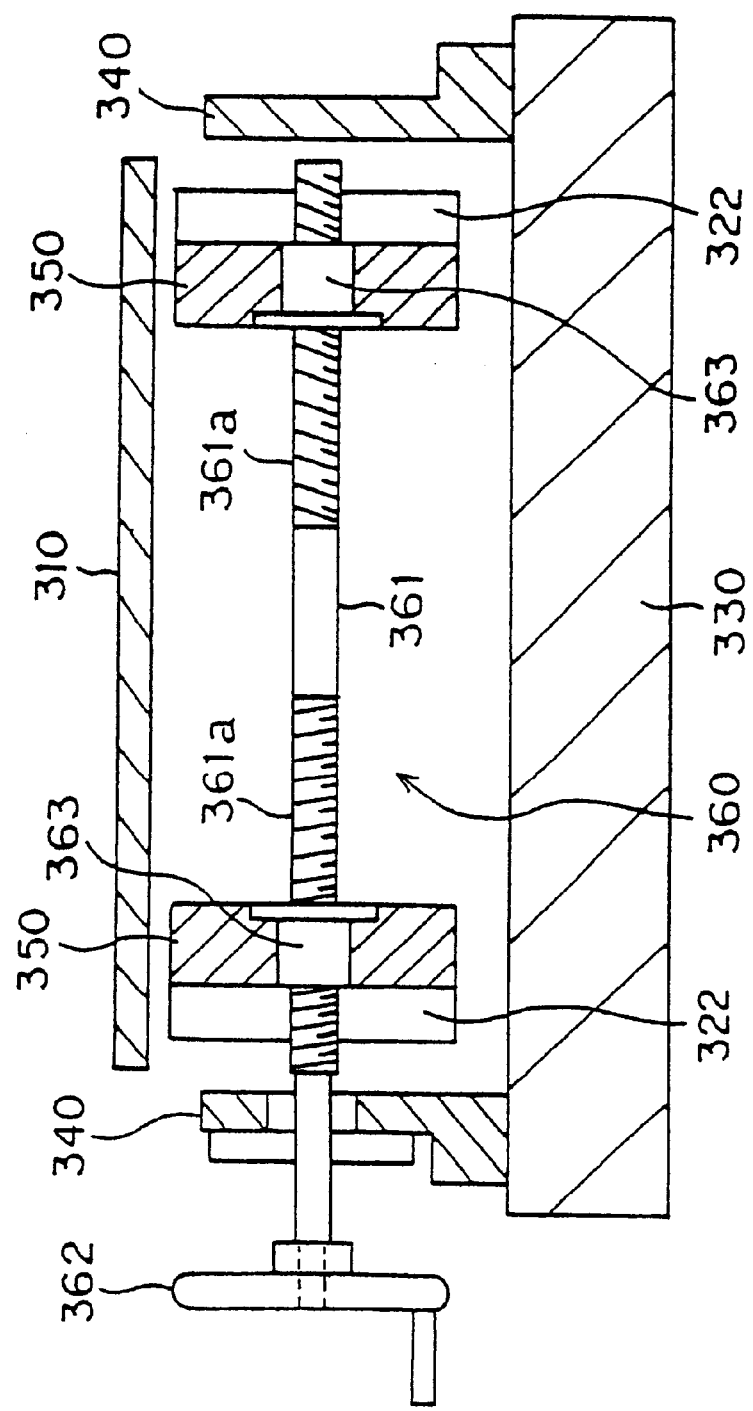
FIG. 5 is a view taken in the direction of the arrows along the line B—B of FIG. 2.
Figure 6:
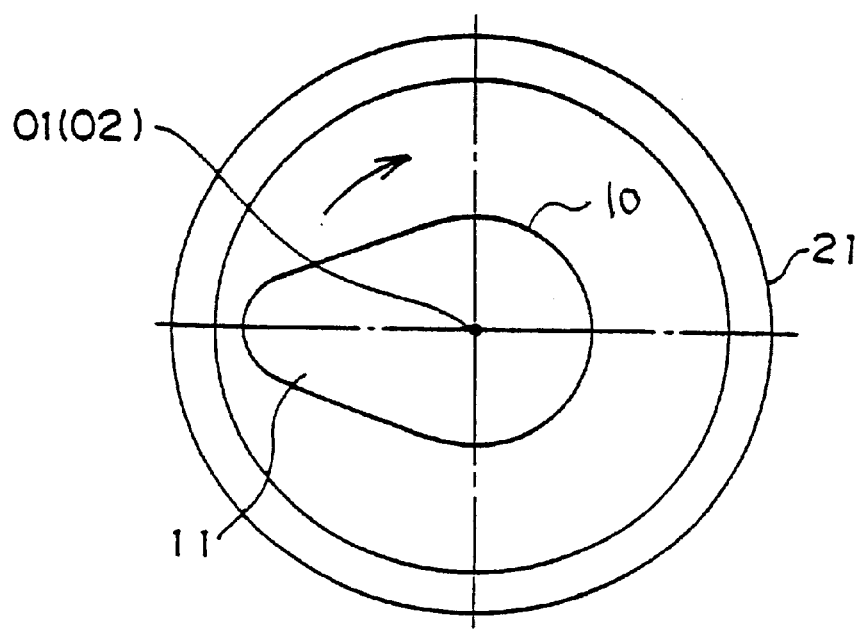
FIG. 6 is an explanatory view of the conventional method for hardening a cam shaft.
Figure 7:
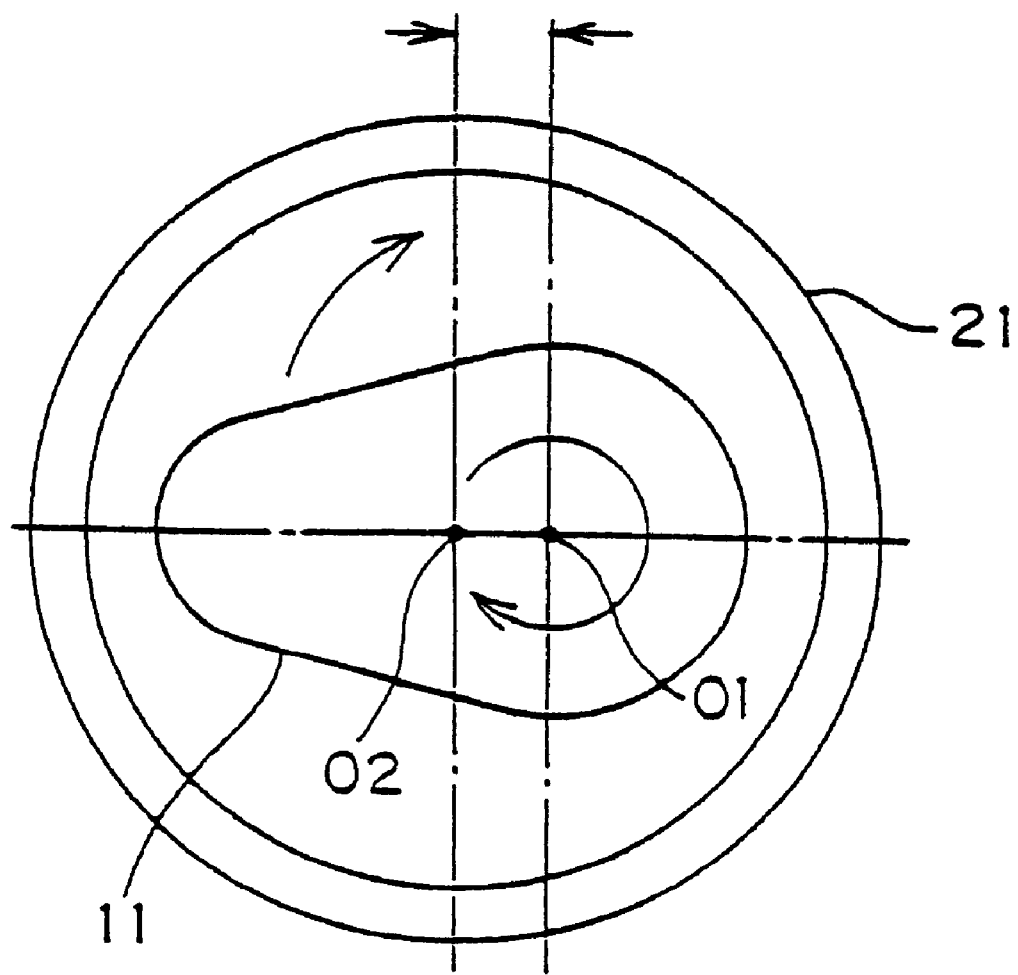
FIG. 7 is an explanatory view of the method for hardening a cam shaft developed by the present applicant.

That is, the operational mechanism 360 has, as shown in FIG. 5, a screw bar 361 which is parallel to the rotation driving shafts 321, 321 on both sides, a handle 362 mounted to one end of the screw bar 361, and a pair of nut portions 363, 363 of the front and rear sides attached to the front and rear coupling plates 350, 350. The screw bar 361 is provided with male screw portions 361a, 361a at two positions in the axial direction. The male screw portions 361a, 361a are formed in opposite directions and are screwed into the pair of nut portions 363, 363 of the front and rear sides, respectively.

As a consequence, by operating the screw bar 361 to rotate in one direction, the coupling plates 350, 350 are symmetrically approached or separated to/from each other, while by operating the screw bar 361 to rotate in another direction, the coupling plates 350, 350 are symmetrically moved in another direction. As a result of this symmetrical movement, in the driving units 320 on both sides, the bearings 322a, 322a of the front and rear eccentric cam units 322, 322 are symmetrically moved in the direction of the center line of the rotation driving shafts 321, 321 together with the respective first rotation sleeves 322, 332 provided inside thereof, and whereby the amounts of eccentricity at the front and rear cam units 322, 322 are adjusted by the same amount including zero.

Next, the eccentric driving apparatuses 300, 300 according to the present embodiment and the function of the hardening equipment employing the same will be explained.

Prior to the hardening, the amounts of eccentricity are adjusted to zero by means of the eccentric driving apparatuses 300, 300. In specific, by operating each eccentric driving apparatus 300 with the operational mechanism 360, the front and rear eccentric cam units 322, 322 are symmetrically operated by means of the driving units 320, 320 on both sides, and the center of the first rotation sleeve 322c is matched to the center of the second rotation sleeve 322d by means of the front and rear eccentric cam units 322, 322. As a result of this, the bearing 322a becomes concentric with the rotation driving shaft 321. Consequently, in the heating devices 200, 200, the heating coils 210, 210 are concentrically aligned.

At this time, the eccentric driving apparatuses 300, 300 may be either in the driving state or in the non-driving state. In the driving state, the rotation driving shaft 321 rotates, while on the other hand, the supporting plate 310 does not move because the amount of eccentricity of the bearing 322a is zero.

Once the heating coils 210, 210 are aligned concentrically in the heating devices 200, 200, the cam shaft 100 is inserted into the heating coils 210,210 and positioned in the hardening position. As a result of this, the plurality of cams 110, 110 having different phases of the cam shaft 100 are located inside the heating coils 210, 210, and the center O1 of the cams 110, 110 is matched with the center of the heating coils 210, 210.

After completion of the positioning of the cam shaft 100, the amounts of eccentricity are adjusted to a certain value by means of the eccentric driving apparatuses 300, 300. In specific, by operating the operational mechanism 360 with each eccentric driving apparatus 300, the front and rear eccentric cam units 322, 322 are symmetrically operated by means of the driving units 320, 320 on both sides, and the first rotation sleeve 322c is made to be eccentric away from the second rotation sleeve 322d by means of the front and rear cam units 322, 322.

As a result of this, in the heating devices 200, 200, the heating coils 210, 210 become eccentric away from the center O1 of the corresponding cams 110, 110 toward the convex side by a certain amount. It is appropriate that the amount of eccentricity is approximately (r1−r2)/2, when maximum diameter and minimum diameter of the cam 110 are defined as r1 and r2, respectively.

After completion of the eccentric operation, the cam shaft 110 is rotated in the circumferential direction, and the driving source 400 is actuated synchronously with that rotation, whereby the eccentric driving apparatuses 300, 300 are driven.

As a consequence of the above, in each eccentric driving apparatus 300, the rotation driving shafts 321, 321 are rotated by means of the driving units 320, 320 on both sides. In the eccentric cam units 322, 322 of the driving unit 320, the first rotation sleeve 322c eccentrically rotates, that is, revolves while being associated with auto-rotation, however, since the outside bearing 322a does not auto-rotate, the first rotation sleeve 322c just revolves. This revolution is transmitted to the transformer 220 of the heating device 200 via the supporting plate 310.

As a result, in the heating devices 200, 200, the heating coils 210, 210 revolve about the center O1 of the cams 110, 110 in synchronous with the rotation of the cams 110, 110 while keeping a certain amount of eccentricity.

In this state, the heating coils 210, 210 are energized so that the outer peripheral surfaces of the cams 110, 110 are heated substantially uniformly in the circumferential direction, followed by cooling, whereby uniform hardening of the outer peripheral surfaces is realized in the whole circumferential direction.

After completion of the hardening, the amount of eccentricity is returned to zero by means of the eccentric driving apparatuses 300, 300. In the heating devices 200, 200, the heating coils 210, 210 are concentrically aligned, so that the cam shaft 100 after hardening is smoothly removed from the inside of the heating coils 210, 210.

In this way, the eccentric driving apparatuses 300, 300 according to the embodiment of the present invention make it possible to arbitrarily adjust the amount of eccentricity by simple straight-ahead operation of the bearing 322a, while keeping the simple structure of commonly using the driving source 400 as it is. And, when applied to simultaneous hardening of the outer surfaces of the cams 110, 110 of the cam shaft 100, they make it possible to smoothly position and remove the cam shaft 100 while suppressing the facility cost.

As described above, in the eccentric driving apparatus according to the present invention, the inner peripheral surface of the first rotation sleeve which is rotatably disposed inside the bearing is inclined in one direction; the outer peripheral surface of the second rotation sleeve which is disposed inside the first rotation sleeve is inclined in one direction in correspondence with the inner peripheral surface of the first rotation sleeve; and the first rotation sleeve and the second rotation sleeve are permitted for relative movement in the direction of the rotation center, so that it is possible to adjust the amount of eccentricity at any values including zero while keeping the simple structure by the eccentric cam. In addition, the operation for adjustment is also easy. Therefore, the eccentric driving apparatus according to the present invention is utilized for revolving the hardening equipment for cam shaft which carries out simultaneous hardening of the outer peripheral surface of each cam of the cam shaft on which plural kinds of cams having different phases are formed, and particularly for revolving the heating device used for simultaneous heating of the cams of the same phase, to allow smooth positioning and removing of the cam shaft while suppressing the facility cost.

What is claimed is:

1. An eccentric driving apparatus for revolving a certain object without being associated with auto-rotation, the eccentric driving apparatus comprising:

a bearing for supporting the object, the bearing being supported so as to be movable in two directions perpendicular to the center of the revolution;

a first rotation sleeve rotatably fitted to the inside of the bearing, having an inner peripheral surface inclined in one direction with respect to the center of rotation;

a second rotation sleeve fitted to the inside of the first rotation sleeve so as to be movable with said first rotation sleeve, having an outer peripheral surface inclined in one direction in correspondence with the inner surface of the first rotation sleeve; and a rotation driving shaft fitted to the inside of the second rotation sleeve so as to be movable with said second rotation sleeve, wherein the first rotation sleeve and the second rotation sleeve are allowed to relatively move in the direction of the center of rotation, thereby configuring an eccentric cam unit having a variable amount of eccentricity.

2. The eccentric driving apparatus according to claim 1, wherein at a plurality of positions in the axial direction of the rotation driving shaft, the eccentric cam unit comprising the bearing, the first rotation sleeve and the second rotation sleeve is provided.

3. The eccentric driving apparatus according to claim 1, wherein plural rotation driving shafts are arranged so as to be parallel with each other, and each rotation driving shaft is provided with the eccentric cam unit comprising the bearing, the first rotation sleeve and the second rotation sleeve.

4. The eccentric driving apparatus according to claim 1, wherein the object is a heating device disposed in hardening equipment for a camshaft having a plurality of cams of the same phase of the camshaft, said heating device disposed so as to simultaneously harden the outer peripheral surface of said plurality of cams of the same phase of the camshaft.

* * * * *